United States Patent [19]

Kitamura

[11] Patent Number: 5,095,235

[45] Date of Patent: Mar. 10, 1992

[54] VEHICLE AC GENERATOR

[75] Inventor: Yutaka Kitamura, Hyogo, Japan

[73] Assignee: Mitsubishi Denki K.K., Tokyo, Japan

[21] Appl. No.: 622,030

[22] Filed: Dec. 4, 1990

[30] Foreign Application Priority Data

Dec. 4, 1989 [JP] Japan .................. 1-316003
Dec. 4, 1989 [JP] Japan .................. 1-316004

[51] Int. Cl.$^5$ ............... H02K 11/00; H02K 9/02; H02K 9/06; H02B 1/56
[52] U.S. Cl. ................ 310/68 D; 310/54; 310/62; 310/64; 361/388
[58] Field of Search ........... 310/52, 54, 58, 59, 310/60 R, 60 A, 62, 63, 64, 68 D, 68 R, 89, 263; 363/141; 361/381, 382, 385, 388

[56] References Cited

U.S. PATENT DOCUMENTS

| 3,562,564 | 2/1971 | Potter | 310/54 |
|---|---|---|---|
| 3,992,133 | 11/1976 | Brunner | 310/54 |
| 4,221,982 | 9/1980 | Raver et al. | 310/54 |
| 4,262,224 | 4/1981 | Kofink et al. | 310/68 D |
| 4,295,067 | 10/1981 | Binder et al. | 310/52 |
| 4,492,885 | 1/1985 | Kitamura et al. | 310/62 |
| 4,500,772 | 2/1985 | Ahner et al. | 310/63 |
| 4,739,204 | 4/1988 | Kitamura et al. | 310/68 D |
| 4,794,285 | 12/1988 | Nimura et al. | 310/68 D |
| 4,818,906 | 4/1989 | Kitamura et al. | 310/54 |
| 4,870,307 | 9/1989 | Kitamura et al. | 310/54 |

FOREIGN PATENT DOCUMENTS

| 59-83557 | 5/1984 | Japan . | |
|---|---|---|---|
| 0189940 | 8/1987 | Japan | 310/90 |
| 0107637 | 4/1989 | Japan | 310/54 |

Primary Examiner—Steven L. Stephan
Assistant Examiner—C. LaBalle
Attorney, Agent, or Firm—Sughrue, Mion, Zinn, Macpeak & Seas

[57] ABSTRACT

A vehicle's AC generator is provided with a rotor magnetic pole core assembly fixedly mounted on a rotary shaft and excited through an exciting coil, stator-coil-mounted stator cores surrounding the magnetic pole core assembly, first and second brackets supporting the stator cores and rotatably supporting the rotary shaft through bearings, a pair of fans provided on both ends of the rotor magnetic pole core assembly, to allow cooling air to flow in the space defined by the first and second brackets, a rectifier, and a voltage regulator. In addition, a cooling solution circulating structure, made of a material high in thermal conductivity, is provided on the side of one of the first and second brackets. The cooling solution circulating structure, which has an upper frame and a lower frame, has a flow path inside to which a cooling solution is supplied from outside. The rectifier and the voltage regulator are mounted on the other surface of the cooling the generator with high efficiency and preventing the temperature increase of the generator.

9 Claims, 5 Drawing Sheets

VEHICLE AC GENERATOR

BACKGROUND OF THE INVENTION

1. Field of the Industrial application

This invention relates to a vehicle's AC generator driven by the engine of a vehicle such as an automobile, and more particularly to an improvement of the cooling technique of the AC generator.

2. Description of the Prior Art

A conventional vehicle's AC generator is as shown in FIG. 5. The AC generator comprises: a housing made up of first and second cup-shaped brackets 1 and 2; and a stator 3 held between the first and second brackets 1 and 2, which is made up of stator cores 3a and a stator coil 3b wound on the cores 3a. A shaft 6 is rotatably supported by bearings 4 and 5 which are fitted in the central portions of the end walls of the first and second brackets 1 and 2, respectively. Magnetic pole cores 7 and 8 are fixedly mounted on the shaft 6 in such a manner that they are located inside the stator 3. Exciting coils 9 are held between the magnetic pole cores 7 and 8. Fans 10a and 10b are installed on the magnetic pole cores 7 and 8, o respectively, so that they are rotated together with the shaft. Slip rings 11 are mounted on the rear end portion of the shaft 6. The shaft 6, the magnetic cores 7 and 8, the exciting coil 9, the fans 10a and 10b, and the slip rings 11 forms the rotor 12 of the AC generator.

Cooling air sucking holes 1a and cooling air discharging holes 1b are formed in the end wall of the first bracket 1, and similarly cooling air sucking holes 2a and cooling air discharging holes (not shown) are formed in the end wall of the second bracket 2. The outer end portion of the second bracket 2 incorporates: a collector 13 including brushes 13a held in slide contact with the slip rings 11; a rectifier 14; a heat sink 14a for radiating heat generated by the rectifier 14; a voltage regulator 16 which detects a generator voltage to control an exciting current thereby to adjust a terminal voltage to a predetermined value; and a heat sink 16a for radiating heat generated by the voltage regulator 16. When, with exciting current supplied to the exciting coil 9 through the brushes 13a and the slip rings 11, the exciting coil 9 and the magnetic pole cores 7 and 8 are rotated through a pulley 15 by the engine (not shown), AC current is induced in the stator coil 3b. The AC current thus induced is converted into DC current by the rectifier 14. The first and second brackets 1 and 2 are secured through the peripheral portions of the stator cores 3a to each other with bolts 20.

The conventional vehicle's AC generator is constructed as described above. When, with exciting current applied to the exciting coil 9 through the brushes 13a and the slip rings 11, the rotor 12 is rotated through the pulley 15 by the engine (not shown), AC current is induced in the stator coil 3b. The AC current thus induced is rectified by the rectifier 14, the output of which is regulated by the voltage regulator 16. In this operation, the fans 10a and 10b are rotated, so that cooling air is sucked into the generator through the cooling air sucking holes of the first bracket 1 as indicated by the arrows (a) in FIG. 1, thus cooling the bearing 4, the magnetic pole cores 7, the exciting coil 9, the stator cores 3a and the stator coil. Thereafter, the cooling air is discharged through the cooling air discharging holes 1b. At the same time, cooling air is sucked into the generator through the cooling air sucking holes 2a of the second bracket 2, thus cooling the bearing 5, the voltage regulator 16, the rectifier 14, the magnetic pole cores 8, the exciting coil 9, and the stator coil 3b. Thereafter, the cooling air is discharged through the cooling air discharging holes 1b.

PROBLEMS TO BE SOLVED BY THE INVENTION

As was described above, in the conventional vehicle's AC generator, cooling air is caused flow into the generator through the cooling air sucking holes 1a and 2a of the first and second brackets 1 and 2, and then flow out of it through the cooling air discharging holes 1b and 2b, to cool the stator coil 3b etc. On the other hand, there has been a strong demand for increasing the output current of a vehicle's AC generator. However, the increasing of the output current of a vehicle' AC generator suffers from the following difficulties: For this purpose, it is necessary to increase the exciting current, and accordingly the quantity of heat generated by the voltage regulator is increased. In addition, increasing the output current results in an increase in the quantity of heat generated by the stator coil 3b and the rectifier 14.

Heretofore, in order to prevent the temperature increase of the AC generator, a method is employed in which a number of large heat radiating fins are provided for the heat sinks 14a and 16a, or the stator coil 3a is increased in diameter. In another method, a cooling solution passageway is formed along the outer periphery of the stator, so that the cooling solution flowing through the cooling solution passageway together with the fans rotated with the rotor cools down the generator (cf. Japanese Patent Application (OPI) No. 557/1984 (the term "OPI" as used herein means an "unexamined published application")). On the other hand, there is a tendency for a vehicle engine to increase its output power, with the results that the temperature in the engine room is increased and the output current of the generator is increased. In this case, the above-described methods are difficult to suppress the increase in temperature of the semiconductor devices included particularly in the rectifier 14 and the voltage regulator 16, thus adversely affecting the generation characteristic.

SUMMARY OF THE INVENTION

In view of the foregoing, an object of this invention is to provide a vehicle's AC generator in which the rectifier and the voltage regulator can be cooled with high efficiency, and the stator coil, exciting coil bearings etc. can be also sufficiently cooled, and which is high in productivity.

In a vehicle s AC generator according to the invention, fans are provided to allow cooling air to flow in the space defined by the brackets a cooling solution circulating structure made of a material high in thermal conductivity and having an upper frame and a lower frame is provided on the side of one of the brackets in such a manner that a cooling solution is supplied to its flow path from outside, and the rectifier and the voltage regulator are mounted on the outer surface of said cooling solution circulating structure.

Further in the vehicle's AC generator according to the invention a cooling air flow path is formed by the bracket and a protective cover.

In the AC generator, the cooling air sucked thereinto by the fans cools the bearings, the magnetic pole cores, stator cores, and the stator coil, while the cooling solution flowing in the flow path of the cooling solution circulating structure cools the rectifier and the voltage regulator.

Furthermore in the AC generator according to the invention, the cooling solution flowing in the flow path of the cooling solution circulating structure provided on the side of the bracket cools the rectifier and the regulator, while the fans act to cause external cooling air to flow in the flow path defined by the bracket and the protective cover, thus cooling the bearings, the magnetic pole cores, the exciting coil, the stator cores, and the stator coil.

DETAILED DESCRIPTION OF THE INVENTION

Figure 5:
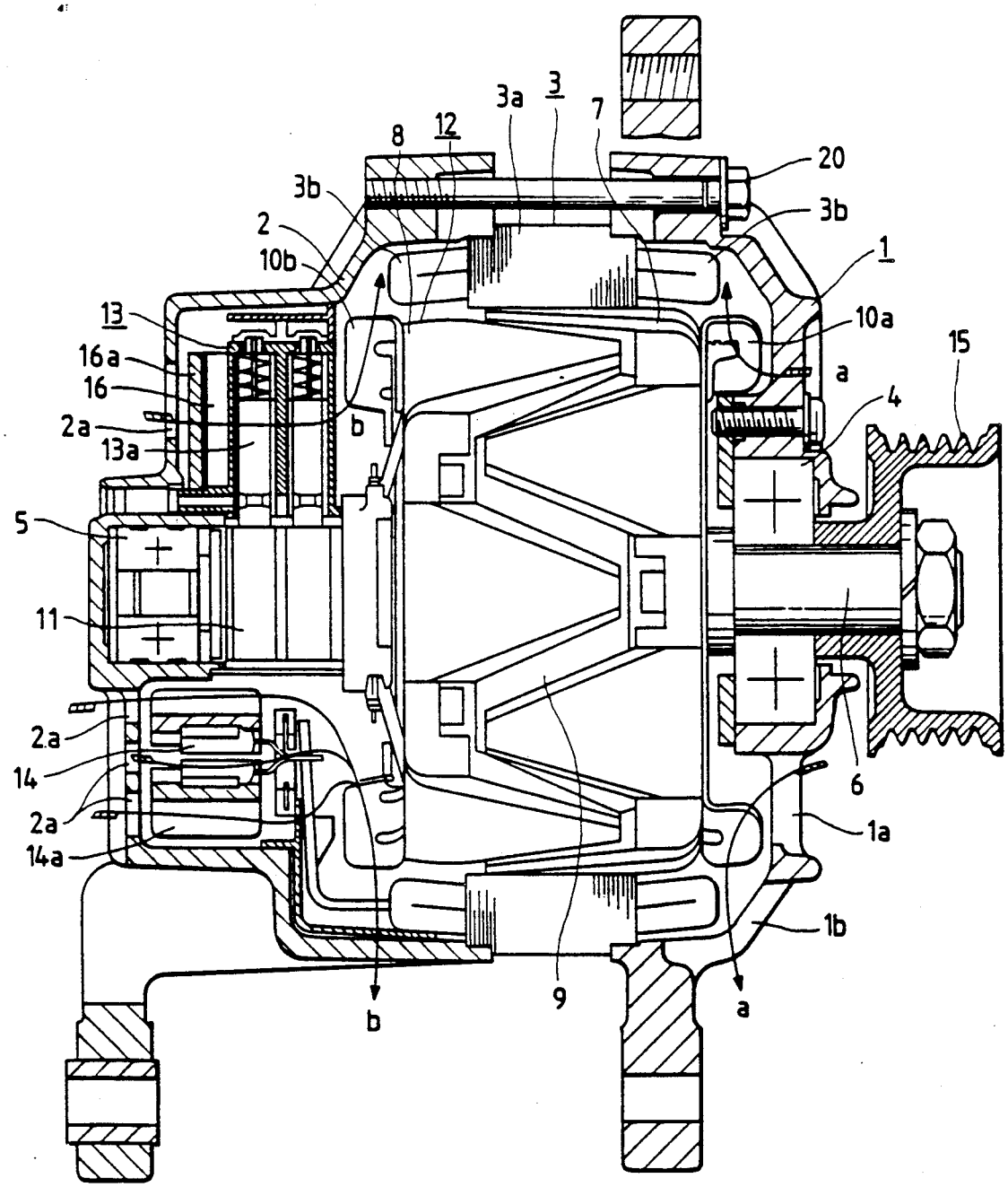
FIG. 5 is a longitudinal sectional view of a conventional vehicle's AC generator.

A first example of a vehicle's AC generator according to this invention will be described with reference to FIGS. 1 and 2. The generator is the same in fundamental arrangement as the conventional vehicle's AC generator shown in FIG. 5; therefore, in FIGS. 1 and 2, parts corresponding functionally to those which have been previously described with reference to FIG. 5 are therefore designated by the same reference numerals or characters.

A cooling solution circulating structure 17 comprising an upper frame 17a and a lower frame 17b is provided on the end face of the second bracket 2. The upper and lower frames 17a and 17b are made of a material different from that of the brackets 1 and 2, such as iron or aluminum alloy high in thermal conductivity. More specifically, the upper and lower frames are formed by pressing and are surface-treated by cation electro-deposition, metal plating or epoxy powder coating. The upper and lower frames 17a and 17b thus formed are combined liquid-tight with a seal member 17c such as a liquid-phase gasket, sheet-shaped gasket or O-ring, and secured to each other by welding or caulking, thus forming a flow path 17d. The flow path 17d thus formed is communicated with a flow-in pipe 23 and a flow-out pipe 24. The heat sink 14a of the rectifier 14, and the heat sink (not shown) of the voltage regulator 16 are held pushed against the cooling solution circulating structure 17 in such a manner that the former are thermally conductive to the latter. A protective cover 18 is connected to the end face of the second bracket 2 in such a manner that a cooling air flow path 26 is formed between the cover 18 and the second bracket 2. The cooling air flow path 26 thus formed has an air sucking inlet 18a opened outside.

Figure 1:
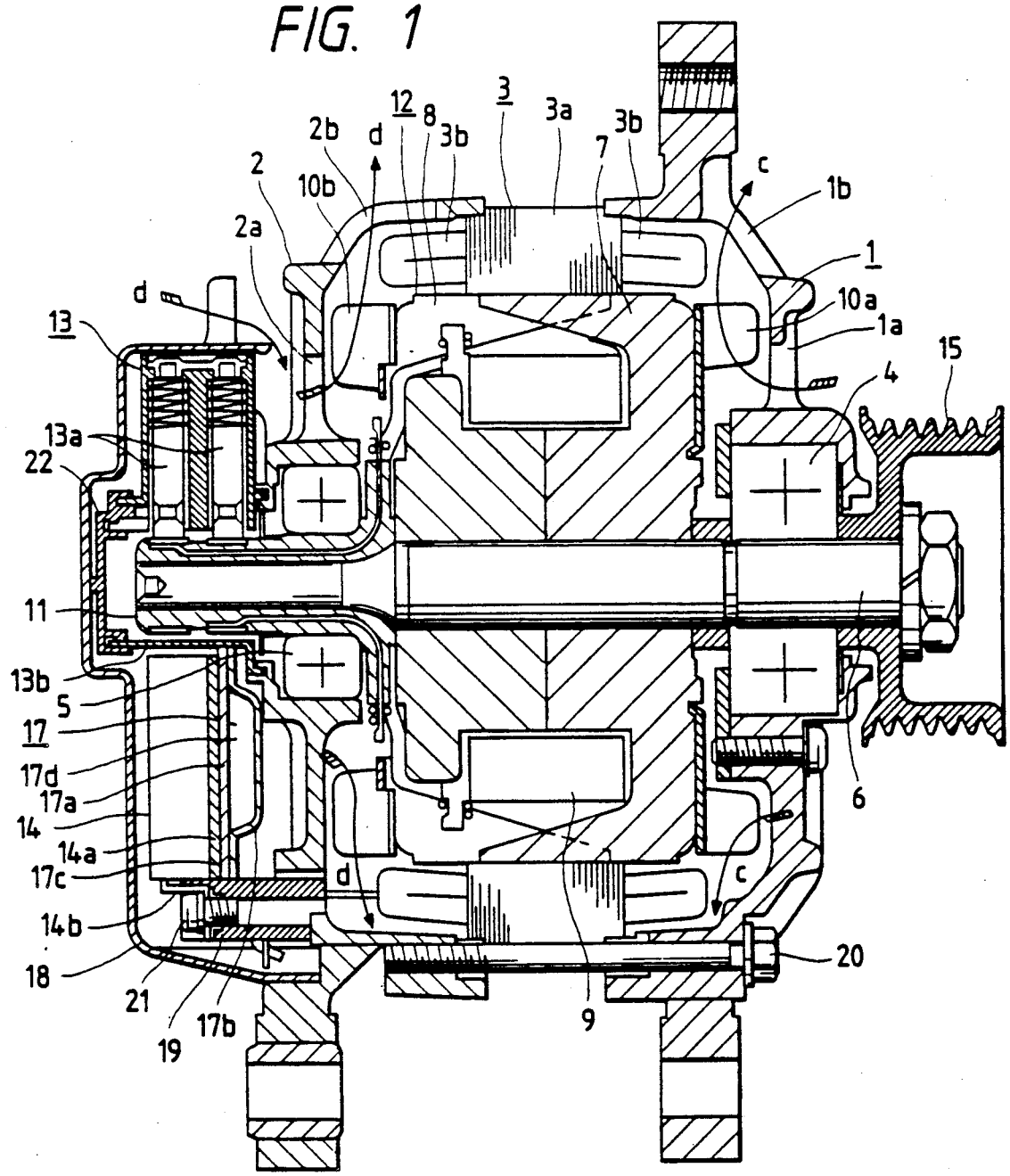
FIG. 1 is a longitudinal sectional view of a first example of a vehicle AC generator according to this invention.
Figure 2:
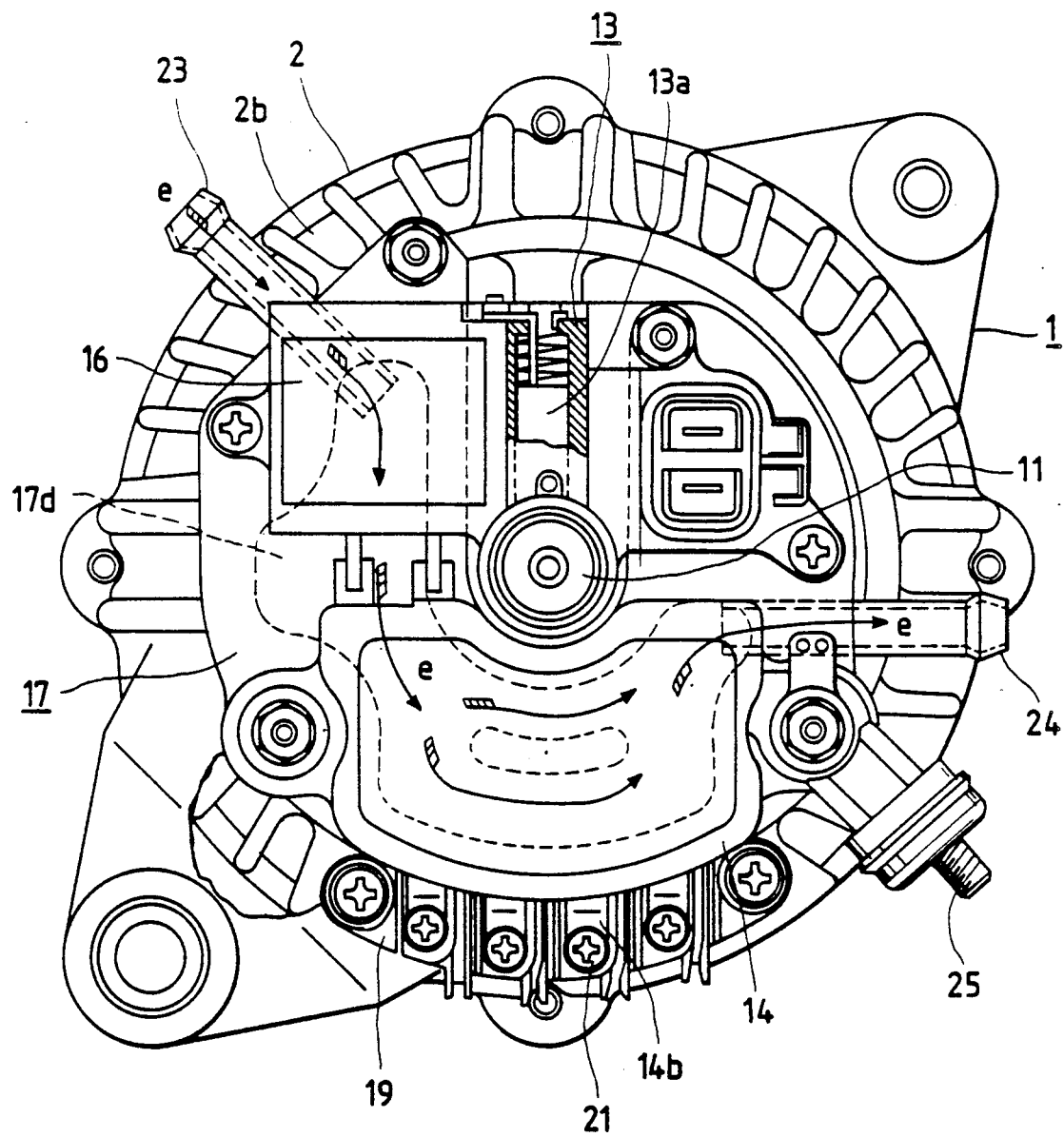
FIG. 2 is a side view of the AC generator with its protective cover removed.

Further in FIGS. 1 and 2, reference numeral 19 designates an insulating connecting terminal base on which the lead wires of the stator coil 3b are fixedly connected to the connecting terminals of the rectifier 14 with connecting screws 21; 22 designates a protective cap forming a labyrinth structure with the protective cylinders 13b of the slip rings 11 integral with the collector 13; and 25 designates an output terminal.

As the rotor 12 is rotated by the engine (not shown), the fans 10a and 10b on both ends of the rotor are turned to suck cooling air into the generator. More specifically, as the fan 10a on the side of the first bracket 1 is rotated, cooling air is introduced into the generator through the cooling air sucking holes 1a as indicated by the arrows (c) to cool the bearing 4, the magnetic pole cores 7, the exciting coil 9, the stator cores 3a and the stator coil 3b, and then discharged through the cooling air discharging holes 1b. Similarly, as the fan 10b on the side of the second bracket 2, cooling air is sucked into the generator through the cooling air sucking holes 2a as indicated by the arrows (d) to cool the bearing 5, the magnetic pole cores 8, the exciting coil 9, the stator cores 3a, and the stator coil 3b, and then discharge through the cooling air discharging holes 2b.

On the other hand, a low temperature cooling solution is partially supplied from the cooling solution circulating path of the engine through a rubber hose or the like to the flow-in tube 23. The cooling solution thus supplied is allowed to flow as indicated by the arrows (e), so as to cool the voltage regulator 16 through its heat sink (not shown) and to cool the rectifier 14 through its heat sink 14a with high efficiency. A part of the cooling solution circulating structure 17 is held pushed against the second bracket 2 near the bearing 5, so that the bearing 5 is cooled through the second bracket 2.

In the AC generator of the invention, unlike the conventional one in which the cooling air flows along the heating generating components, namely, the rectifier 14 and the voltage regulator 16, to cool them directly, the cooling air flows outside the protective cover 18 and along the surface of the lower frame 17b of the cooling solution circulating structure 17, and therefore its air flow resistance is low; that is, the flow rate of the cooling air is great. Thus, the stator coil 3b, the exciting coil 9, the bearings 4 and 5, etc. can be sufficiently cooled.

In the above-described vehicle's AC generator of the invention, the cooling air flows without directly contacting the rectifier 14 and the voltage regulator 16. This prevents the occurrence of difficulty that dust or salt water vapor mixed with the cooling air is deposited on the terminals of the o rectifier 14 and the voltage regulator 16 to erode them, thus lowering the generation characteristic. In addition, the protective cover 18 acts to substantially seal the rectifier 14, the voltage regulator 16, and the slip rings 11. Therefore, the vehicle's AC generator according to the invention is excellent in the durability against muddy water, dust, salt water, etc.

A second example of the vehicle's AC generator according to the invention will be described with reference to FIGS. 3 and 4.

The second example of the vehicle's AC generator is fundamentally the same in arrangement as the first example shown in FIGS. 1 and 2. Therefore, in FIGS. 3 and 4, parts corresponding functionally to those which have been described with reference to FIGS. 1 and 2 are therefore designated by the same reference numerals or characters.

Figure 3:
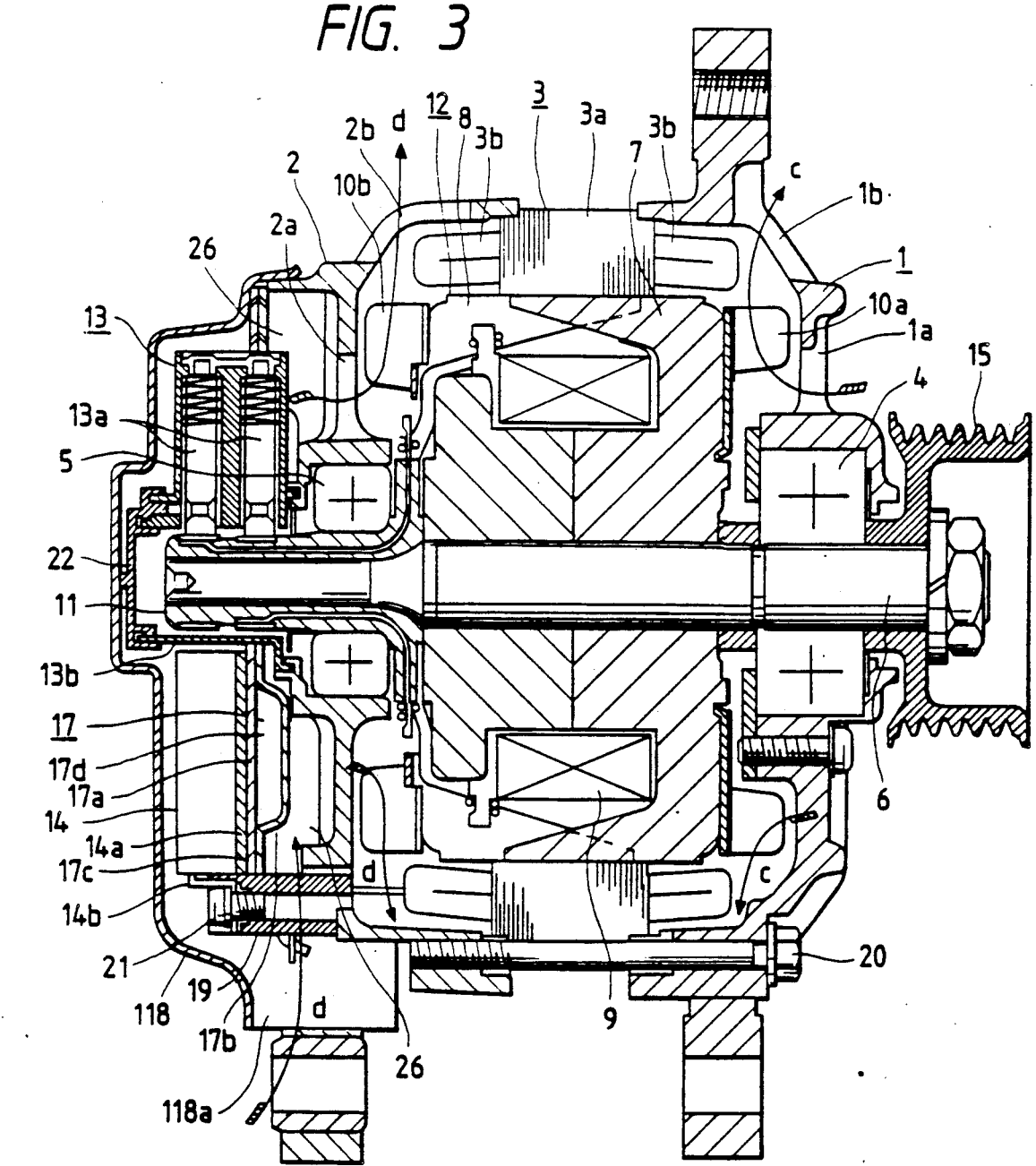
FIG. 3 is a longitudinal sectional view of a second example of the vehicle's AC generator according to the invention.
Figure 4:
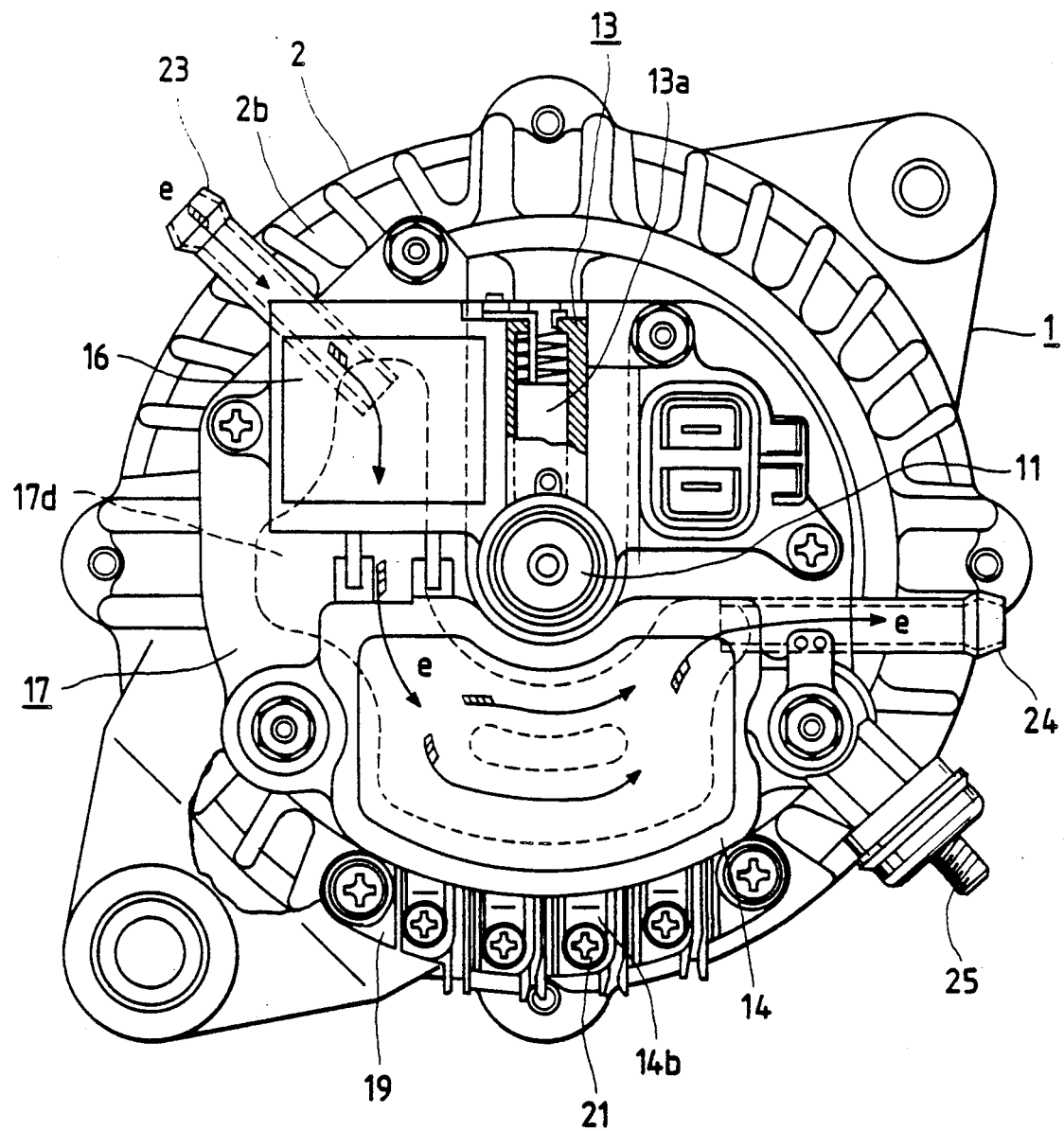
FIG. 4 is a side view of the second example of the AC generator with its protective cover removed.

In the AC generator shown in FIGS. 3 and 4, its protective cover 118 has an air sucking inlet 118a which is positioned at the part of the engine room which is relatively low in ambient temperature, so that the cooling air introduced into the bracket as indicated by the arrow (d) is decreased in temperature. Furthermore, the cooling air discharging holes 2b are set away from the air sucking inlet 118a, so that the difficulty is eliminated that the high temperature cooling air discharged through the cooling air discharging holes 2b is partially led to the cooling air sucking holes 2a.

In the above-described first and second examples of the vehicle's AC generator, the insulating film is formed on the surface of at least the upper frame of the cooling solution circulating structure by cation electro-deposition or by epoxy powder coating. Hence, even if depositions containing salt water are formed on the electrodes of the rectifier 14 and the voltage regulator 16, no electrolytic erosion will occur with those electrodes.

Furthermore, in the above-described examples, the upper frame 17a of the cooling solution circulating structure 17 has no heat-radiating fins; however, the invention is not limited thereto or thereby. That is, the upper frame 17a may have such heat-radiating fins, for improvement of the cooling effect.

In addition, in the above-described examples, the upper and lower frames 17a and 17b of the cooling solution circulating structure 17 are joined liquid-tight with the seal member 17c; however, it goes without saying that the upper and lower frames may be joined into one liquid-tight unit, for instance, by welding.

As was described above, in one example of the vehicle's AC generator according to the invention, the cooling air sucked thereinto by the fans is utilized to cool the bearings, the magnetic pole cores, the exciting coil, the stator cores, and the stator coil, while the cooling solution flowing in the flow path of the cooling solution circulating structure is utilized to cool the rectifier and the regulator. Hence, the AC generator is cooled with high efficiency, and can therefore increase its output current with the exciting current increased.

Furthermore, in another example of the AC generator of the invention, the cooling solution flowing in the flow path of the cooling solution circulating structure is utilized to cool the rectifier and the voltage regulator, while the cooling air which is introduced into the generator through the air sucking inlet provided for the protective cover and caused to flow inside the bracket through the flow path defined by the bracket and the protective cover is utilized to cool the bearings, the magnetic pole cores, the exciting coil, the stator cores, and the stator coil. Accordingly, the generator is cooled with high efficiency, and can therefore increase its output current with the exciting current increased. Moreover, the generator is excellent in productivity.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A vehicle's ac generator comprising: a rotor magnetic pole core assembly fixedly mounted on a rotary shaft and excited through an exciting coil; stator-coil-mounted stator cores surrounding said magnetic pole core assembly: first and second brackets supporting said stator cores and rotatably supporting said rotary shaft through bearings; a pair of fans provided on both ends of said rotor magnetic pole core assembly, to cause cooling air to flow in the space defined by said first and second brackets; a rectifier; and a voltage regulator, characterized in that, a cooling solution circulating structure comprising an upper frame and a lower frame being provided on the side of one of said first and second brackets, said cooling solution circulating structure having a flow path inside to which a cooling solution is supplied from outside, and said cooling solution circulating structure made of a material high in thermal conductivity, said rectifier and said voltage regulator are mounted on the outer surface of said cooling solution circulating structure.

2. A vehicle's AC generator according to claim 1, in which said upper frame and said lower frame are combined liquid-tight with a seal member.

3. A vehicle's AC generator according to claim 2, in which said seal member is selected from a group comprising a liquid-phase gasket, sheet-shaped gasket and a O-ring.

4. A vehicle's AC generator according to claim 1, in which said upper frame and said lower frame are secured to each other by welding or caulking.

5. A vehicle's AC generator according to claim 1, in which said upper and lower frames are made of a material different from that of the brackets.

6. A vehicle's AC generator according to claim 1, in which said upper and lower frames are made of one of iron alloy and aluminum alloy.

7. A vehicle's AC generator according to claim 1, further comprising a cover means for forming a cooling air flow path on the side of one of said first and second bracket.

8. A vehicle's AC generator according to claim 7, in which said cover means is formed by a protective cover and one of said first and second bracket.

9. A vehicle's AC generator according to claim 8, in which said protective cover has an air sucking inlet.

* * * * *